UNITED STATES PATENT OFFICE.

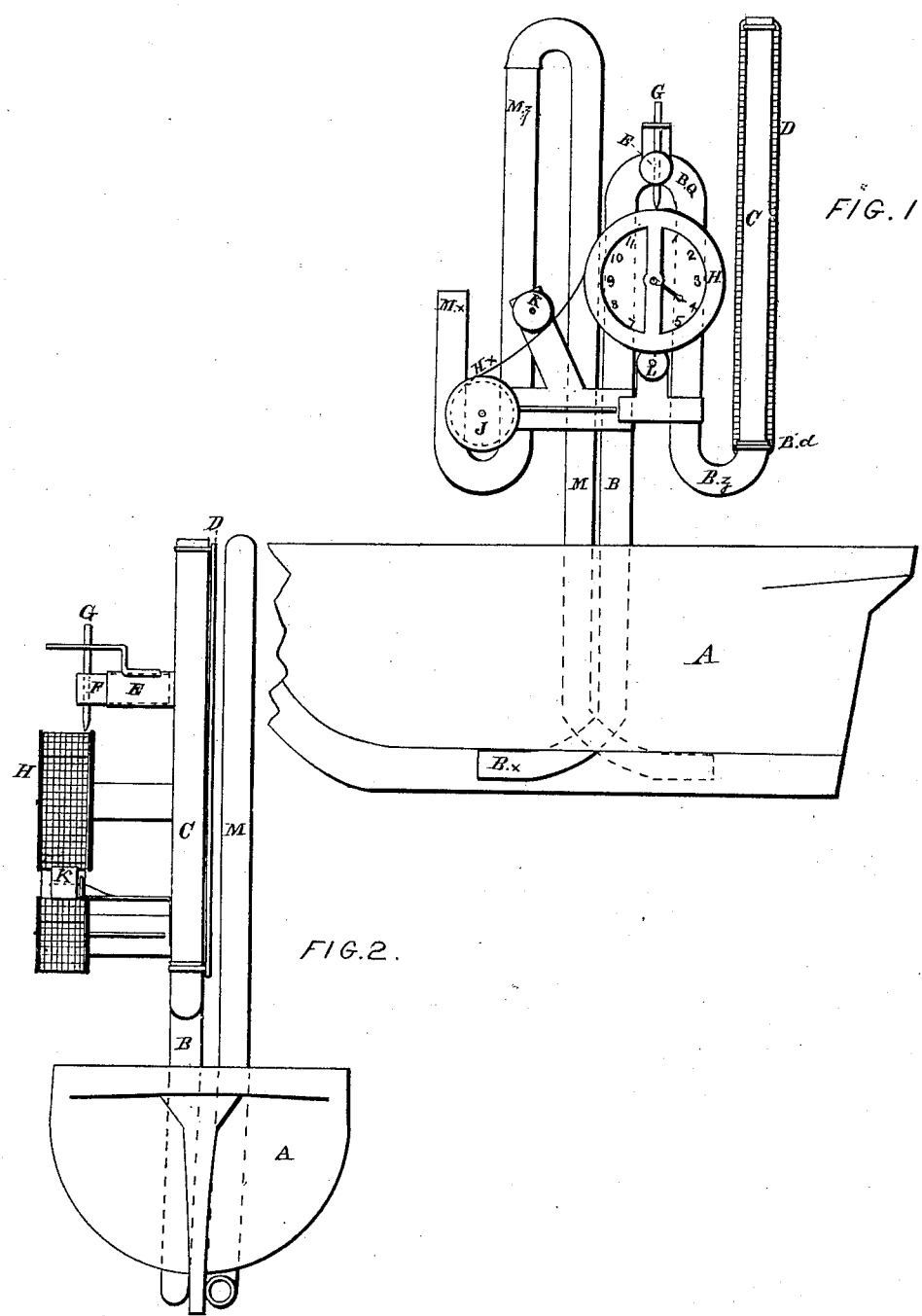

THOMAS C. ROBINSON, OF BOSTON, MASSACHUSETTS.

IMPROVEMENT IN SHIPS' LOGS.

Specification forming part of Letters Patent No. 169,660, dated November 9, 1875; application filed January 2, 1875.

*To all whom it may concern:*

Be it known that I, THOMAS CROCKER ROBINSON, of Boston, Suffolk county, and State of Massachusetts, have invented a new and Improved Ship's Log, which I call a registering ship's log, (or a hydrostatic chronometer ship's log,) of which the following is a specification:

The nature of my invention is that of a pipe, with its lower end open and fronting toward the bow of the vessel, and attached to the vessel by the side of the keel, or at other convenient place below water, from whence it proceeds to the wheel-house, or other convenient location, where it is bent in a manner hereinafter described, and connected with an open glass tube, which is furnished with a scale and partly filled with a column of mercury. The pressure of the water in the progress of the vessel against the air confined in the pipe raises the column of mercury in the glass tube to an extent proportioned to the rate of progress of the vessel, and shown by the scale. At one point in the wheel-house the pipe is furnished with a device consisting of a case containing clock-work, moving a narrow strip of paper, and with a pencil so connected with the air-pipe as that it moves in and out, in accordance with the varying pressure of the confined air, and by means of these the rate of progress of the vessel is registered. Another device used with, and sometimes attached to, the one hereinabove partially described, of a pipe, (whose lower end opens toward the stern of the vessel,) a glass tube, and a column of mercury, indicates the flow of the tide when the vessel is at anchor, all as hereinafter more fully described.

Figure 1 is a view of the device from the side, with a representation of the hull of a ship, to which the device is supposed to be attached. Fig. 2 is a view of the device from the stern end of the ship.

In the drawings, A, Figs. 1 and 2, is the ship's hull. B is the metallic or other pipe proceeding from the hull out into the water by the side of the keel, at $B^x$, Fig. 1, where its mouth is open, facing toward the bow of the ship. From the keel the pipe is conducted by any convenient route to and above the deck of the ship, and thence preferably to the wheel-house. At $B^9$, Fig. 1, this pipe curves and proceeds downward a short distance to the point $B^z$, where it curves again and proceeds perpendicularly upward. At the point marked $B^d$ it carries a glass tube, C, Figs. 1 and 2, open at the top, of nearly the same diameter and bore. To this glass tube C is attached a scale, D, marked with graduations, and seen in face in Fig. 1 and at the edge in Fig. 2. E, Figs. 1 and 2, is a pipe of the same diameter with the pipe B, and proceeding from it horizontally, (see Fig. 2,) its bore connecting with that of the pipe B. This pipe E carries a similar pipe, F, Fig. 2, which slides into and out of it. The outer end of the pipe F is closed; the inner end is open. The pipe F carries perpendicularly a smaller tube, G, Figs. 1 and 2, firmly fixed to it, and bearing at its lower end a pencil. I sometimes make this tube G sliding, and attach to it an india-rubber or other spring to allow the pencil to rise as the diameter of the roll of paper increases. H, Figs. 1 and 2, is a case which contains a clock-work movement, (preferably a chronometer movement,) which clock-work is wound up from time to time, as is required to tighten the spring. The clock carries a dial-plate, marked with the usual clock-figures and a hand. The case H rotates by means of the clock movement, and bears, fastened to it, one end of a slip of paper, $H^x$, Fig. 1, marked with longitudinal and cross lines, hereinafter explained, as seen in Fig. 2. This slip of paper rolls up on the case H as the latter rotates. The rest of the slip of paper is rolled on the roller J, (which simply bears it unattached, Figs. 1 and 2, and is kept in place in its passage by the friction-roller K, Figs. 1 and 2. L, Figs. 1 and 2, is a friction-roller, whose function is to keep the slip of paper close to the outside of the case H. The glass tube C carries at the point $B^z$ a body of quicksilver, which reaches from the point $B^d$ to a point on the same level in the metallic pipe B. M, Figs. 1 and 2, is another metallic tube, proceeding from a point beneath the bottom of the ship, at the side of the keel, up to the deck, and above it to the height seen in the drawing—say, to the wheel-house. At its lower end this tube M turns at a right angle, and exposes horizontally its open mouth in a direction facing to the stern end of the ship. At its upper end, in the wheel-house, this tube curves and proceeds downward a short distance, where it carries a short glass tube, $M^z$, which proceeds downward to a point where the glass tube enters a metallic tube, $M^x$, Fig. 1, which, again curving, proceeds upward to a short distance, where its end is closed. I sometimes close this end of the tube $M^x$ by means of a stopper, screwing in and out. At this point a body of quicksilver is put in, which body reaches from the short division of the pipe, at the point $M^x$, to a little way up in the glass tube $M^z$. This tube $M^z$ sometimes bears a scale marked with graduated horizontal lines, which are numbered.

The device being charged with mercury, and the clock being wound up, the ship is supposed to be loaded and lying at the wharf or at anchor. The pressure of the water at the open mouth, at the lower end of the pipe B, compresses the confined air between the mouth of the pipe and the column of mercury, which is thus driven up the glass tube at the point $B^d$, thus passing more or fewer divisions on the graduated scale D. This pressure, and the consequent elevation of the mercury, as shown by the scale D, is greater as the submersion of the mouth of the pipe B is greater. In other words, the heavier the vessel is loaded, and the lower it sinks in the water, the higher the mercury rises in the scale. The scale D is sometimes movable up and down, and is therefore readily so arranged as that the lowest horizontal line on the scale is at an elevation coincident with the highest point thus reached by the mercury. I sometimes, however, make the scale fixed, and effect the same end by the use of a cock to let out the confined air till the mercury falls to the lowest scale line. This point of the lowest line is, therefore, the initial point from which I note the rate of progress through the water of the vessel. The vessel being then supposed to have commenced her voyage, and to be moving through the water, the water presses more forcibly against the body of confined air, and the further end of the column of mercury becomes still more elevated. The scale is seen in Fig. 2 to be marked with equal divisions, each of which indicates a mile of progress per hour of the vessel. Each space is also equally subdivided into eight smaller spaces, indicating each one-eighth of a mile's progress. The rate, then, of the progress per hour of the vessel is seen at a glance on the scale. The clock-work is meanwhile slowly winding up the strip of paper, drawing it from the roller J. When thus winding the paper passes beneath the pencil in the tube G, the rate of rotation of the case surrounding the clock-work carrying the strip of paper being so graduated as that an interval of fifteen minutes elapses between the passage beneath the pencil of any two of the heavy crosswise lines seen in Fig. 2, and each minute is also marked, fourteen crosswise lines being inscribed on the strip between each heavy line. The pencil thus makes a continuous mark on the strip of paper, which mark or line is varied in this manner: The air confined in the pipe B, being compressed by the water, presses against the stopped end of the horizontal movable pipe F, Fig. 2, and moves it out, and on the pressure being relaxed the atmospheric pressure carries the pipe F, with its tube G and the pencil, back. Upon the strip of paper are seen, in Fig. 2, several lines passing lengthwise of the strip. The first line, nearest the tube B, being marked by the pencil, shows one mile per hour progress of the vessel. The second line shows two miles per hour, and so on, the pressure of the water, by the accelerated passage of the vessel, increasing, and the pencil being pushed out from the one-mile line to the mile-lines of greater number, the pencil receding toward the one-mile line as the rate of progress of the vessel, and consequently the pressure of the confined air, diminishes.

I am now to describe the other portion of the device—that for measuring the rate of the flow of the tidal or other current. The column of mercury borne by the tube $M^z$ is diminished in height, as the passage of the water from the bow toward the stern of the ship, as the latter lies at anchor, attenuates the body of confined air, thus diminishing the pressure on the column of mercury. As this occurs the column of mercury rises at that end of the column nearest the submerged mouth of the tube, thus lowering the other end of the column in the glass tube $M^z$, which, lowering, shows the rate at which the water passes the vessel, or the submerged mouth of the tube M. I sometimes have my graduated scale movable so as to slide up and down, for the reason that when the vessel has greater draft in consequence of being loaded the static pressure of the water raises the end of the column of mercury farthest from the water, irrespective of any tidal or other current, thus varying the location of the initial point in the glass tube $M^z$, the lowering beneath which of the end of the mercurial column forms my means of measuring the pressure effected by the passing current of water. I also sometimes effect the same result by making my scale fixed, and using the device of a stop-cock to admit the air into the pipe M, thus diminishing the attenuation of the theretofore confined air. I sometimes use a plunger, moving back and forward just within the submerged end of one or both of my pipes B and M, or, instead thereof, a flexible diaphragm, going across the respective mouths, which devices have the advantage of preventing deposits of foreign substances in the mouth of the pipe; but I prefer the means I have hereinabove fully described. I sometimes use other liquids than mercury for purposes of indication. I sometimes use a float placed upon the top of my indicating-liquid column, and moving up and down with it, and dispense with the glass tube; and I sometimes, by the use of a plunger or diaphragm, dispense with the confined air, and continue my column of indicating-liquid downward till it meets with the diaphragm or plunger; and I sometimes use the column of confined air and the direct pressure of the water, and dispense with my liquid-indicating column, using instead thereof a flexible diaphragm or a plunger at the upper end of my pipes.

I claim—

The combination of the pipe B, with the lower end submerged, turned toward the bow of the vessel, open and exposed to the pressure of the water, with the movable connected tube F and its pencil, the clock-work and case H, and the graduated strip of paper H$^{\times}$, when fitted for use for the purpose of measuring and recording the progress of vessels through the water, all substantially as shown and described.

THOMAS CROCKER ROBINSON.

Witnesses:
LEMUEL P. JENKS,
O. P. GREEN.